US010807526B2

(12) United States Patent
Persson et al.

(10) Patent No.: US 10,807,526 B2
(45) Date of Patent: Oct. 20, 2020

(54) VEHICLE INTERIOR LIGHTING SYSTEM

(71) Applicant: Volvo Car Corporation, Göthenburg (SE)

(72) Inventors: Johan Anders Persson, Göthenburg (SE); Markus Lars Edvin Andersson, Göthenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/276,172

(22) Filed: Feb. 14, 2019

(65) Prior Publication Data
US 2020/0262341 A1 Aug. 20, 2020

(51) Int. Cl.
B60Q 3/62 (2017.01)
B60Q 3/60 (2017.01)
B60Q 3/14 (2017.01)
B60Q 3/233 (2017.01)
B60Q 3/74 (2017.01)
B60Q 3/217 (2017.01)

(52) U.S. Cl.
CPC ............... B60Q 3/62 (2017.02); B60Q 3/14 (2017.02); B60Q 3/217 (2017.02); B60Q 3/233 (2017.02); B60Q 3/60 (2017.02); B60Q 3/74 (2017.02); B60Q 2500/10 (2013.01)

(58) Field of Classification Search
CPC . B60Q 3/62; B60Q 3/217; B60Q 3/74; B60Q 3/60; B60Q 3/233; B60Q 2500/10; B60Q 3/10; B60Q 3/54; B60Q 3/78; B60Q 3/64; B60Q 3/66; B60R 13/02; B60R 2013/0287
See application file for complete search history.

(56) References Cited

U.S. PATENT DOCUMENTS

| 5,647,657 | A | 7/1997 | Damasky et al. |
| 6,517,226 | B1 | 2/2003 | Zimmermann et al. |
| 7,889,290 | B2 | 2/2011 | Mills |
| 9,123,267 | B2 | 9/2015 | Rensmo |
| 9,618,671 | B2* | 4/2017 | Gaydoul ............... F21S 43/13 |
| 10,053,026 | B2* | 8/2018 | Sato ..................... B60R 13/02 |
| 10,059,259 | B2* | 8/2018 | Cannon .................. B60Q 3/54 |

(Continued)

FOREIGN PATENT DOCUMENTS

DE 10240270 A1 3/2004
DE 102012006712 A1 7/2013
(Continued)

OTHER PUBLICATIONS

Extended European Search Report issued in European Application No. 20157302.9 dated Jun. 18, 2020, 8 pp.

*Primary Examiner* — Peggy A Neils
(74) *Attorney, Agent, or Firm* — Shumaker & Sieffert, P.A.

(57) ABSTRACT

A vehicle lighting system for a vehicle a light guide and a light dispensing device configured to receive light from a light source via the light guide and emit the light into an interior of the vehicle. A first end of the light guide is coupled to the light source and a second end of the light guide is coupled to the light dispensing device. The light dispensing device includes a textile configured to dispense the light from the light guide to an interior of the vehicle and a reflector configured to reflect the light within the light dispensing device that is received from the light guide towards the textile.

18 Claims, 3 Drawing Sheets

(56) References Cited

U.S. PATENT DOCUMENTS

| | | |
|---|---|---|
| 10,562,446 B2 | 2/2020 | Cannon |
| 2005/0242607 A1 | 11/2005 | Neumann |
| 2007/0019425 A1 | 1/2007 | Van Lier et al. |
| 2009/0073708 A1* | 3/2009 | Kino ........................ B60Q 3/74 |
| | | 362/490 |
| 2009/0251917 A1 | 10/2009 | Wollner et al. |
| 2011/0128755 A1* | 6/2011 | Ludwig ................... B60Q 3/74 |
| | | 362/555 |
| 2011/0141760 A1* | 6/2011 | Ory .......................... B60Q 3/64 |
| | | 362/555 |
| 2011/0228553 A1 | 9/2011 | Igoe et al. |
| 2014/0340920 A1 | 11/2014 | Bayersdorfer |
| 2015/0062954 A1 | 3/2015 | Crossland et al. |
| 2016/0154170 A1* | 6/2016 | Thompson ........ G02F 1/133603 |
| | | 362/609 |
| 2017/0217366 A1 | 8/2017 | Kraemer et al. |
| 2018/0074251 A1* | 3/2018 | Berard ................. G02B 5/0242 |
| 2018/0087765 A1 | 3/2018 | Horter et al. |
| 2018/0297515 A1 | 10/2018 | Lalulet et al. |
| 2019/0255992 A1* | 8/2019 | Betz ........................ B60Q 3/54 |
| 2019/0283667 A1 | 9/2019 | Eitel et al. |

FOREIGN PATENT DOCUMENTS

| | | |
|---|---|---|
| DE | 102016121042 A1 | 5/2018 |
| DE | 102016225413 A1 | 7/2018 |
| EP | 1418090 B1 | 3/2005 |
| EP | 3072743 A2 | 9/2016 |
| FR | 2877896 A1 | 5/2006 |

\* cited by examiner

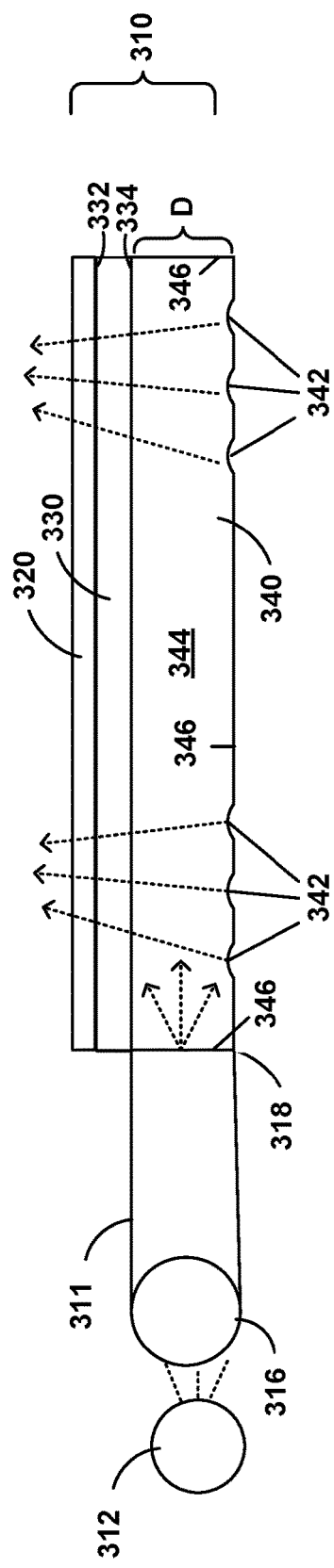
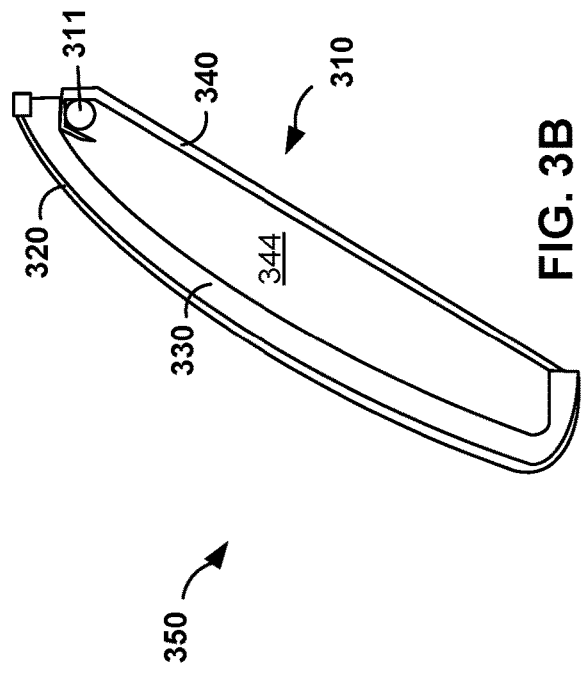
FIG. 3A
FIG. 3B

VEHICLE INTERIOR LIGHTING SYSTEM

TECHNICAL FIELD

The present disclosure relates to interior lighting systems for motorized vehicles.

BACKGROUND

The interior of a vehicle is often lit by one or more light fixtures. Example light fixtures within a vehicle include dome lights, floor lights, reading lights, mirror lights, etc.

SUMMARY

In general, the disclosed subject matter relates to a vehicle lighting system for lighting an interior of a vehicle. The vehicle lighting system a light guide and a light dispensing device configured to transmit or dispense light from a light source into the interior of the vehicle. The light guide couples the light source to the light dispensing device and may enable the light dispensing device and the light source to be located in physically separate areas, which may improve the serviceability of the light dispensing devices or light sources. For example, physically separating the light source from the light dispensing device may enable the light source to be located in a more accessible location, such that the light source may be removed and replaced without removing or replacing the light dispensing device.

In one example, the light dispensing device includes a lens having a plurality of light scattering objects that scatter the light into the interior of the vehicle. To scatter light, some techniques utilize a lens in one layer and a light scattering object in an additional, separate layer. In some examples described in this disclosure, light dispensing devices of this disclosure may have fewer layers by including light scattering objects within the lens. Reducing the number of layers may reduce the size (e.g., thickness) of the light dispensing device and may reduce manufacturing complexity and/or cost.

In another example, the light dispensing device includes a reflector layer that includes a plurality of ridge that reflect light in various directions. Some techniques utilize light scattering objects that dispense light evenly. In some examples, light dispensing devices of this disclosure may direct light in various directions to produce light gradients within the interior of the vehicle. The light gradients may increase the visual appeal or ambience within the interior of the vehicle as compared to even dispensing of light.

In one example, a vehicle lighting system for a vehicle includes a light guide and a light dispensing device. A first end of the light guide is coupled to a light source and a second end of the light guide is coupled to the light dispensing device. The light dispensing device is configured to receive light from the light source via the light guide and dispense the light from the light guide to an interior of the vehicle. The light dispensing device includes a textile configured to dispense the light from the light guide to the interior of the vehicle and a reflector configured to reflect the light within the light dispensing device that is received from the light guide towards the textile, and a lens located between the textile and the reflector.

In another example, a vehicle lighting system for a vehicle includes a light guide and a light dispensing device. A first end of the light guide is coupled to a light source and a second end of the light guide is coupled to the light dispensing device. The light dispensing device is configured to receive light from the light source via the light guide and dispense the light from the light guide to an interior of the vehicle. The light dispensing device includes a textile configured to dispense the light from the light guide to an interior of the vehicle and a reflector configured to reflect the light towards the textile, wherein an interior surface of the reflector faces the textile and the interior surface of the reflector includes a plurality of ridges configured to reflect the light within the light dispensing device that is received from the light guide towards the textile to produce a gradient of the light at the textile.

In another example, a vehicle lighting system for a vehicle includes a light guide and a light dispensing device. A first end of the light guide is coupled to a light source and a second end of the light guide is coupled to the light dispensing device. The light dispensing device is configured to receive light from the light source via the light guide and dispense the light from the light guide to an interior of the vehicle. The light dispensing device includes a textile configured to dispense the light from the light guide to an interior of the vehicle, a reflector configured to reflect the light within the light dispensing device received from the light guide towards the textile, and a diffusor lens located between the textile and the reflector, the diffusor lens including a plurality of scattering objects disposed between a front surface of the diffusor lens and a back surface of the diffusor lens to scatter the light within the lens in a plurality of directions.

BRIEF DESCRIPTION OF DRAWINGS

FIG. 3A illustrates a cross-sectional view of an example vehicle lighting system, in accordance with one or more techniques of this disclosure.

FIG. 3B illustrates another cross-sectional view of a vehicle lighting system, in accordance with one or more techniques of this disclosure.

DETAILED DESCRIPTION

Figure 1:
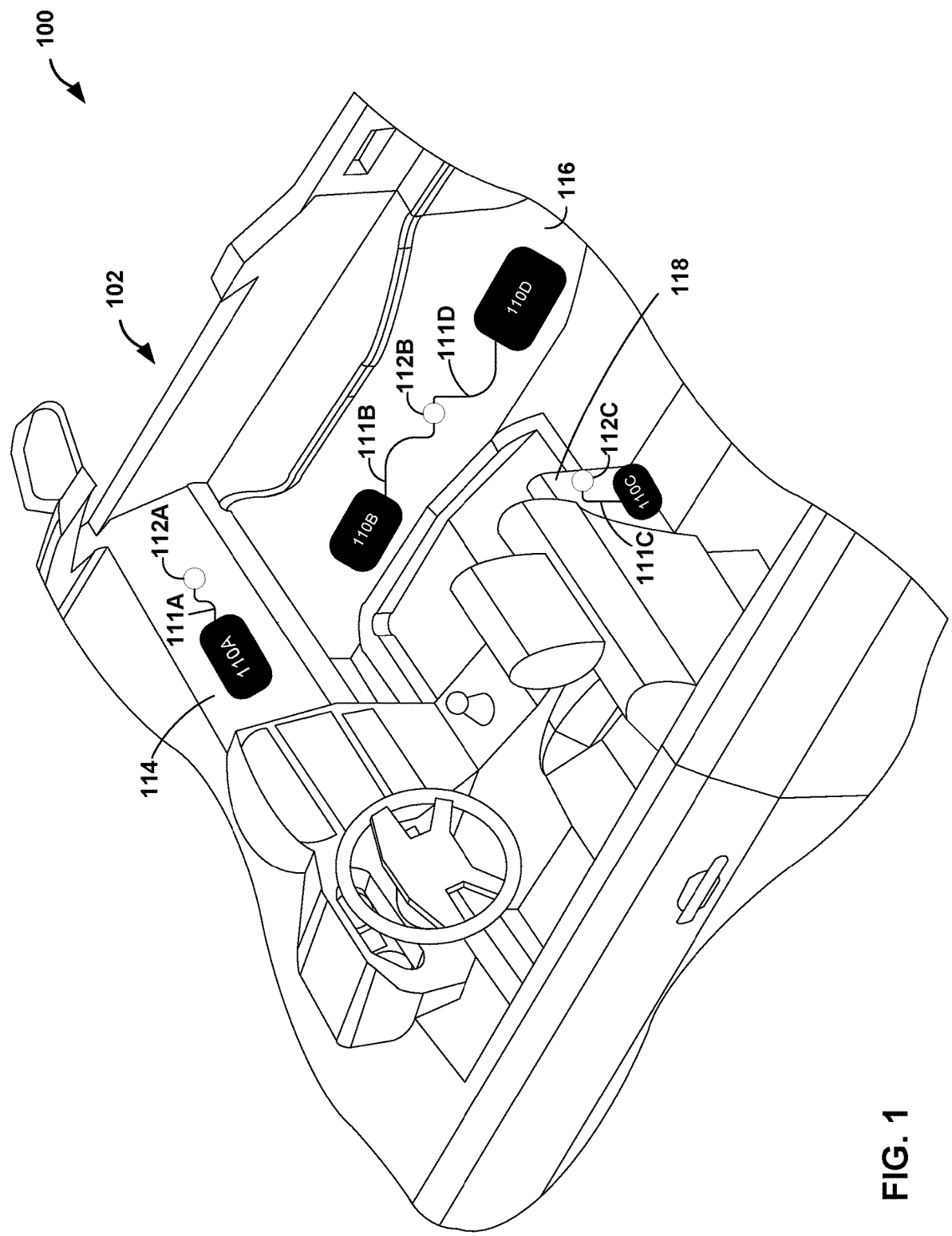
FIG. 1 is a conceptual diagram illustrating an example vehicle that includes an interior lighting system, in accordance with one or more techniques of this disclosure

FIG. 1 is a conceptual diagram illustrating an example vehicle 100 that includes an interior vehicle lighting system 102, in accordance with one or more techniques of this disclosure. Vehicle 100 may include any type of autonomous, semi-autonomous, or non-autonomous vehicle. Examples of vehicle 100 include cars, trucks, buses, motorcycles, recreational vehicles (RVs), tractors, all-terrain vehicles, watercraft, or any other type of vehicle. Vehicle 100 may include an internal combustion engine (ICE), one or more electric motors (EM), or a combination therein (e.g., vehicle 100 may be a hybrid vehicle).

Vehicle lighting system 102 includes at least one light dispensing device 110A-110D (collectively, light dispensing devices 110), at least one light source 112A-112C (collectively, light sources 112), and at least one light guide 111A-111D (collectively, light guides 111). Examples of light sources 112 include light emitting diodes (LEDs), fluorescent lights, incandescent lights, and lasers, among others. Example light guides 111 include a plastic optical fiber or a glass optical fiber. Plastic optical fibers include thermoplastic polymers, such as acrylic (e.g., poly methyl methacrylate (PMMA)) or polycarbonate (PC). As described in further detail below, each of light dispensing devices 110 receive light from one or more light sources 112 and transmit or dispense the light to an interior of vehicle 100.

Each light dispensing device 110 is coupled to at least one light source 112 via one of light guides 111. As illustrated in FIG. 1, light source 112A is coupled to light dispensing device 110A via light guide 111A and light source 112C is coupled to light dispensing device 110C via light guide 111C. In some examples, a light source of light sources 112 may be coupled to more than one light dispensing device 110. For instance, in the example of FIG. 1, light source 112B is coupled to light dispensing device 110B via light guide 111B and to light dispensing device 110D via light guide 111D. Light guides 111 may be approximately 10 centimeters, approximately 50 centimeters, approximately 100 centimeters, approximately 1 meter, or any other distance. In this way, light guides 111 may enable each light dispensing device 110 to be located in physically separate areas within vehicle 100 (e.g., within different components of vehicle 100, or greater than a threshold distance from one another, such that, without a light guide 1111, a particular light dispensing device 110 would not receive enough light from a particular light source 112 to dispense light to the interior of vehicle 100). Further, light guides 111 may enable light dispensing devices 110 to be separable from light sources 112 (e.g., such that a particular light dispensing device 110A may be decoupled from a particular light source 112A and the particular light dispensing device 110A may be removed from vehicle 110A without removing the particular light source 112A to which the particular light dispensing device 110A was previously coupled, or vice versa).

In some examples, each of light dispensing devices 110 and the light source 112 to which the respective light dispensing device 110 is coupled are disposed within the same component of vehicle 100. In the example of FIG. 1, light dispensing device 110A and light source 112A are disposed in a dashboard panel 114, light dispensing devices 110B, 110D and light source 112B are disposed in a door panel 116, and light dispensing device 110C and light source 112C are disposed in a center console 118. One or more of light dispensing devices 110 or light sources 112 may be disposed in other components of vehicle 100, such as a vehicle roof, headrest, seat back, among others. In some examples, a light dispensing device (e.g., light dispensing device 110A) and a light source (e.g., light source 112A) to which the light dispensing device is coupled may be disposed in different components of vehicle 100. As one example, light dispensing device 110A may be disposed within roof panel (also referred to as a ceiling panel) and may be coupled to light source 112A, which may be disposed within dashboard panel 114. In such examples, light guide 111A may be disposed along an "A" pillar of vehicle 100, where the "A" pillar connects the roof to a forward region (e.g., engine compartment) of vehicle 100 and/or holds a windshield of vehicle 100 in place.

In accordance with techniques of this disclosure, light dispensing devices 110 and light sources 112 are separable from one another. In some other techniques, the light dispensing device includes the light source. By utilizing separable light sources and light dispensing devices (e.g., couplable via light guides), in some examples, the light dispensing devices 110 of this disclosure may be smaller (e.g., reduced thickness) than other light dispensing devices. Utilizing smaller light dispensing devices 110 may enable light dispensing devices 110 to be located in areas of vehicle 100 that may unable to accommodate larger (e.g., thicker) light dispensing devices. Further, coupling light dispensing devices 110 to light sources 112 via light guides 111 may improve the serviceability of the light dispensing devices 110 or light sources 112. For example, physically separating a light source 112 from a light dispensing device 110 may enable the light source 112 to be located in a more accessible location and may enable a person to remove and replace a particular light source 112 without removing or replacing the associated light dispensing device to which the particular light source is coupled.

Figure 2A:
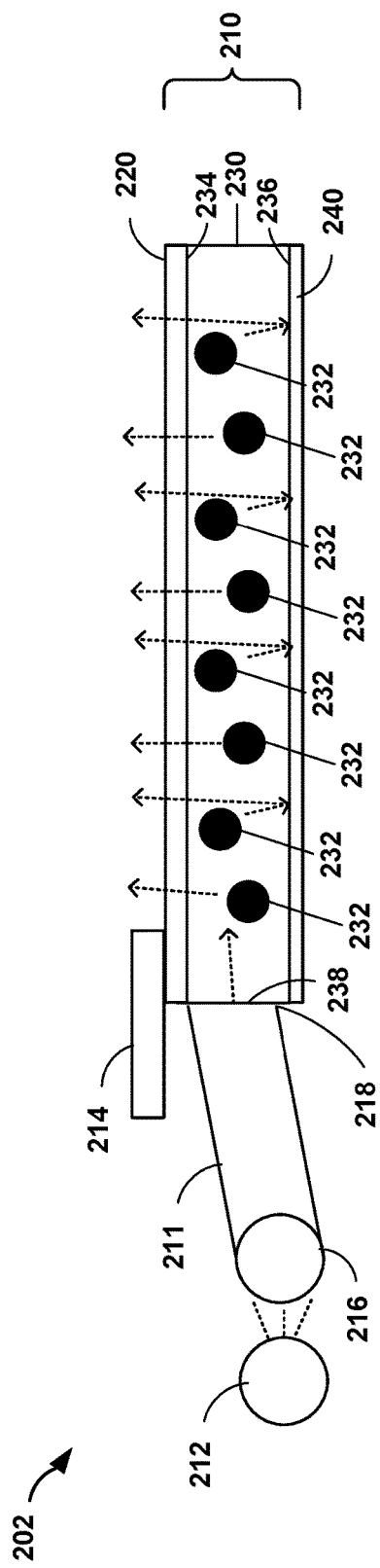
FIG. 2A illustrates a cross-sectional view of an example vehicle lighting system, in accordance with one or more techniques of this disclosure

FIG. 2A illustrates a cross-sectional view of an example vehicle lighting system 202, in accordance with one or more techniques of this disclosure. Vehicle lighting system 202 may be an example of vehicle lighting system 102 of FIG. 1. In the example of FIG. 2A, vehicle lighting system 202 includes a light dispensing device 210, light guide 211, and light source 212. Vehicle lighting system 202 may also include a shield layer 214. Light dispensing device 210, light guide 211, and light source 212 may be examples of light dispensing devices 110, light guides 111, and light sources 112 of FIG. 1, respectively. In some examples, vehicle lighting system 202 includes fewer components or additional components not shown in FIG. 2A.

Light guide 211 is configured to dispense light emitted by light source 212 to light dispensing device 210, such that light dispensing device 210 dispenses the light to an interior of a vehicle. For example, a light entry end 216 (e.g., first end) of light guide 211 may be coupled to light source 212 and a light exiting end 218 (opposite the light entry end 216) of light guide 211 (e.g., second end) may be coupled to light dispensing device 210. In some examples, light guide 211 includes a flexible material configured to dispense light. In other words, light guide 211 may be configured to receive light from light source 212 on the light entry end 216 of light guide 211, internally refract light for the length of light guide 211, and dispense light out the light exiting end 218 of light guide 211 such that the light travels into light dispensing device 210. Light guide 211 may include a flexible material, such as a thermoplastic (e.g., polycarbonate or PMMA). Light guide 211 may be generally cylindrical (e.g., when straight) and may have a length that is greater than a radius of light guide 211.

In the example of FIG. 2A, light dispensing device 210 includes a textile layer 220, lens 230, and reflector layer 240. Lens 230 is disposed between textile layer 220 and reflector layer 240. At least a portion of textile layer 220, lens 230, and reflector layer 240 may be substantially parallel to one another. In other words, at least a portion of textile layer 220 defines a first plane, at least a portion of lens 230 defines a second plane, and at least a portion of reflector layer 240 defines a third plane, each plane being substantially parallel to one another.

Textile layer 220 is configured to dispense light from light source 212 (via light guide 211) to an interior of the vehicle. Textile layer 220 includes any type of translucent or transparent material that dispenses at least a portion of light emitted by light source 211. In some examples, textile layer 220 includes nylon, vinyl, leather, suede, or other fabric, or a material designed to appears as a particular type of fabric (e.g., a faux leather).

Lens 230 may include a thermoplastic polymer, such as PMMA or polycarbonate. In some examples, lens 230 is a diffusor lens and includes a plurality of scattering objects 232 configured to scatter or diffuse light in different directions. Scattering objects 232 may include air bubbles, crystals, or other objects that deflect light in different directions. In the example of FIG. 2A, scattering objects 232 are disposed within an interior of lens 230, for example, between a front surface 234 of lens 230 and a back surface 236 of lens 230. For example, as illustrated in FIG. 2A, scattering objects 232 may be disposed throughout lens 230 (e.g., uniformly or regularly disposed within lens 230), such that light dispensing device 210 dispenses light into the interior of vehicle 100 substantially homogenously. In one example, scattering objects 232 may be disposed in select locations within lens 230. For example, scattering objects 232 may be sporadically or irregularly disposed within lens 230, such that light dispensing device 210 dispenses light with relatively light or dark areas. In other words, the brightness of light dispensed by light dispensing device 210 may appear as a gradient or irregular pattern rather than appearing homogenous or uniform. In some examples, light scattering objects 232 scatter light within lens 230 and cause the light to exit through textile layer 220 (e.g., directly, or via reflector layer 240). By locating light scattering objects within the lens, light dispensing device 210 may have fewer layers, which may reduce the size (e.g., thickness) of the light dispensing device and may reduce manufacturing complexity and/or cost.

In the example of FIG. 2A, reflector layer 240 is coupled (e.g., directly coupled) to lens 230. For example, reflector layer 240 may be directly coupled to back surface 236 of lens 230. Reflector layer 240 may include any type of reflective material configured to reflect light. In some examples, reflector layer 240 includes a thermoplastic polymer, such as polypropelene (PP), polycarbonate, acrylonitrile butadiene styrene (ABS), or PMMA. Reflector layer 240 may include a reflective film, such as a reflective polyester or aluminum. In the example of FIG. 2A, reflector layer 240 includes a substantially smooth surface, such that the angle of incidence of incoming light and the angle of reflection of dispensed light with respect to a line normal to the surface of reflector layer 240 are approximately equal. In another example, reflector layer 240 includes a plurality of ridges configured to reflect light in a particular direction or pattern.

In some examples, the diameter of light guide 211 and the thickness of lens 230 are substantially equal. For example, the diameter of light guide 211 and thickness of lens 230 may each be approximately 4 mm in diameter. In some instances, the diameter of light guide 211 and the thickness of lens 230 may be different. For instance, the diameter of light guide 211 may be approximately 3 mm and the thickness of lens 230 may be larger or smaller than the diameter of light guide 211.

In some examples, lens 230 is coupled to light exiting end 218 of light guide 211. For example, light exiting end 218 of light guide 211 may be disposed adjacent to side surface 238 of lens 230. For instance, as illustrated in the example of FIG. 2A, the light exiting end 218 of light guide 211 is planar with the plane defined by lens 230. In this way, light travels from light source 212 through light guide 211 into lens 230 of light dispensing device 210, such that the light travels out of lens 230 through textile layer 220 and into the interior of the vehicle.

Shield layer 214 includes an opaque material configured to hide the light exiting end 218 of light guide 211 from being visible within the interior of the vehicle. In some examples, shield layer 214 includes a plastic, metal, wood, fabric (e.g., relatively thick compared to textile layer 220), or other material that does not transmit or dispense light.

Figure 2B:
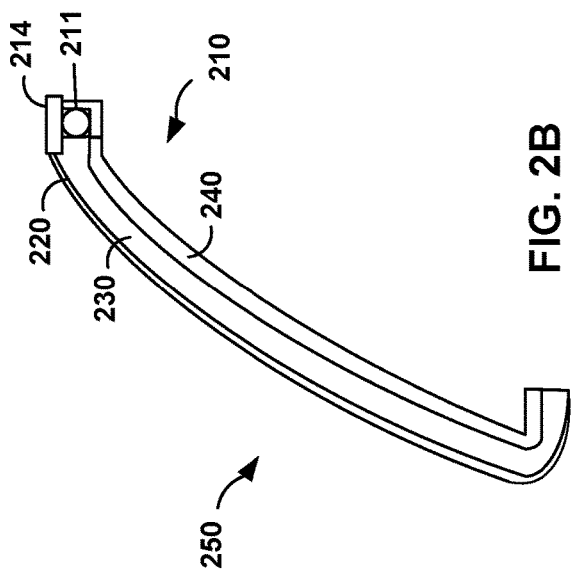
FIG. 2B illustrates another cross-sectional view of a vehicle lighting system, in accordance with one or more techniques of this disclosure.

FIG. 2B illustrates another cross-sectional view of a vehicle lighting system 202 of FIG. 2A, in accordance with one or more techniques of this disclosure. In the example, of FIG. 2B, vehicle lighting system 202 includes dashboard panel 250, light dispensing device 210 and light guide 211 (light source 212 is omitted from FIG. 2A for purposes of illustration only). Dashboard panel includes light dispensing device 210, as described above with reference to FIG. 2A. Dashboard panel 250 is an example of dashboard panel 114 of FIG. 1.

FIG. 3A illustrates a cross-sectional view of an example vehicle lighting system 302, in accordance with one or more techniques of this disclosure. Vehicle lighting system 302 may be an example of vehicle lighting system 102 of FIG. 1. In the example of FIG. 3A, vehicle lighting system 302 includes a light dispensing device 310, light guide 311, and light source 312. Light dispensing device 310, light guide 311, and light source 312 may be examples of light dispensing devices 110, light guides 111, and light sources 112 of FIG. 1, respectively. In some examples, vehicle lighting system 302 includes fewer components or additional components not shown in FIG. 3A.

Light guide 311 is configured to dispense light emitted by light source 312 to light dispensing device 310, such that light dispensing device 310 dispenses the light to an interior of a vehicle. For example, a light entry end 316 of light guide 311 (e.g., first end) may be coupled to light source 312 and a light exiting end 318 (opposite the light entry end 316) of light guide 311 (e.g., second end) may be coupled to light dispensing device 310. In some examples, light guide 311 includes a flexible material configured to dispense light. In other words, light guide 311 may be configured to receive light from light source 312 on light entry end 316 of light guide 311, internally refract light for the length of light guide 311, and dispense light out the light exiting end 318 of light guide 311 such that the light travels into light dispensing device 310. Light guide 311 may include a flexible material, such as a thermoplastic (e.g., polycarbonate or PMMA). Light guide 311 may be generally cylindrical (e.g., when straight) and may have a length that is greater than a radius of light guide 311.

In the example of FIG. 3A, light dispensing device 310 includes a textile layer 320, lens 330, and reflector layer 340. Lens 330 is disposed between textile layer 320 and reflector layer 340. At least a portion of textile layer 320, lens 330, and reflector layer 340 may be substantially parallel to one another. In other words, at least a portion of textile layer 320 defines a first plane, at least a portion of lens 330 defines a second plane, and at least a portion of reflector layer 340 defines a third plane, each plane being substantially parallel to one another.

Textile layer 320 includes any type of translucent or transparent material that dispenses at least a portion of light emitted by a light source. In some examples, textile layer 320 includes nylon, vinyl, leather, suede, other fabric, or a material designed to appears as a particular type of fabric (e.g., a faux leather).

Lens 330 may include a thermoplastic polymer, such as PMMA or polycarbonate. In the example of FIG. 3A, lens 330 is substantially transparent such that lens 330 dispenses light with relatively little reflection (e.g., light passes through lens 330). In some examples, lens 330 includes a plurality of scattering objects (e.g., within an interior of lens 330) that are configured to scatter or diffuse light in different directions, as described with reference to lens 230 of FIG. 2A. Lens 330 includes a front surface 332 facing textile layer 320 and a back surface 334.

Reflector layer 340 may include any type of reflective material configured to reflect light. In some examples, reflector layer 340 includes a thermoplastic polymer, such as polypropelene, polycarbonate, ABS, or PMMA. An interior surface 346 of reflector layer 340 may include a reflective film, such as a reflective polyester or aluminum. A back surface 334 of lens 330 and the interior surface 346 of reflector layer 340 define a volume 344 of gas (e.g., air). For example, light emitted by light source 312 enters the volume 344 from light guide 311 at the light exiting end 348 of light guide 311. In some instances, some of the light may pass directly through the volume 344, lens 330, and textile layer 320. Some of the light may reflect off the interior surface 346 of reflector layer 340 (e.g., reflect off one or more of ridges 342) before passing through lens 330 and textile layer 320.

In one example, the interior surface 346 of reflector layer 340 is substantially smooth surface, such that the angle of incidence of incoming light and the angle of reflection of dispensed light with respect to a line normal to the surface of reflector layer 240 are approximately equal. In the example of FIG. 3A, the interior surface 346 of reflector layer 340 includes a plurality of ridges 342 configured to reflect light in a particular direction or pattern. Ridges 342 may be semi-circular, triangular, trapezoidal, or any other shape configured to reflect light. In some examples, the location, size, shape, or density of ridges 342 may be chosen to reflect light in a particular direction or pattern. For instance, ridges 342 may be disposed relatively densely in one region of reflector layer 340 compared to another region of reflector layer 340 (e.g., a quantity of ridges 342 in one region of reflector layer 340 may be greater than a quantity of reflecting objects 342 in another similarly sized region of reflection layer 340), such that a region of textile layer 320 may appear brighter than another region of textile layer 320. In this way, the ridges 342 of reflector layer 340 may reflect light in various directions, which may illuminate the interior of the vehicle with different amounts of light in different areas, thereby potentially increasing the visual appeal or ambience within the interior of the vehicle.

In some examples, the diameter of light guide 311 and the depth D of the volume 344 are substantially equal. For example, the diameter of light guide 311 and depth D of volume 344 may each be approximately 4 mm in diameter. In some instances, the diameter of light guide 311 and the depth D of volume 344 may be different. For instance, the diameter of light guide 311 may be approximately 3 mm and the depth of volume 344 may be larger or smaller than the diameter of light guide 311.

In the example of FIG. 3A, the light exiting end 318 of light guide 311 is aligned with volume 344. In other words, light exiting light guide 311 is directed into volume 344. In this way, light travels from light source 312 through light guide 311 into volume 344 of light dispensing device 310. Upon entering volume 344, some of the light may travel out of lens 330 through textile layer 320 and into the interior of the vehicle, while some of the light may reflect off interior surface 346 of reflector layer 340 and then travel through lens 330 and textile layer 320 into the interior of the vehicle.

FIG. 3B illustrates another cross-sectional view of a vehicle lighting system 302, in accordance with one or more techniques of this disclosure. In the example, of FIG. 3B, vehicle lighting system 302 includes dashboard panel 350, light dispensing device 310 and light guide 311 (light source 312 is omitted from FIG. 3A for purposes of illustration only). Dashboard panel includes light dispensing device 310, as described above with reference to FIG. 3A. Dashboard panel 350 is an example of dashboard panel 114 of FIG. 1.

Various examples have been described. These and other examples are within the scope of the following claims.

What is claimed is:

1. A vehicle lighting system for a vehicle, the vehicle lighting system comprising:
 a light guide having a first end and a second end, wherein the first end of the light guide is coupled to a light source;
 a light dispensing device coupled to the second end of the light guide and configured to receive light from the light source via the light guide and dispense the light received from the light guide to an interior of the vehicle, the light dispensing device comprising:
  a textile configured to dispense the light from the light guide to the interior of the vehicle;
  a reflector configured to reflect the light within the light dispensing device that is received from the light guide towards the textile; and
  a diffusor lens located between the textile and the reflector, wherein the diffusor lens includes a plurality of scattering objects disposed between a front surface of the diffusor lens and a back surface of the diffusor lens to scatter the light within the diffusor lens in a plurality of directions,
  wherein an interior surface of the reflector faces the diffusor lens, and wherein the interior surface of the reflector includes a plurality of ridges configured to reflect the light within the light dispensing device to produce a gradient of the light at the textile, wherein the gradient of the light at the textile comprises a non-homogenous and non-uniform pattern of light.

2. The vehicle lighting system of claim 1, wherein the reflector is directly coupled to the back surface of the diffusor lens.

3. The vehicle lighting system of claim 1, wherein the second end of the light guide is disposed adjacent to a side surface of the diffusor lens to direct the light from the light source into the diffusor lens.

4. The vehicle lighting system of claim 1, wherein an interior surface of the reflector is substantially smooth.

5. The vehicle lighting system of claim 1, wherein a back surface of the diffusor lens and an interior surface of the reflector define a volume that receives the light from the second end of the light guide.

6. The vehicle lighting system of claim 1, wherein the light guide is a first light guide and the light dispensing device is a first light dispensing device, the vehicle lighting system further comprising:
 a second light guide having a first end and a second end, wherein the first end of the second light guide is coupled to the light source; and
 a second light dispensing device coupled to the second end of the second light guide to receive the light from the light source and dispense the light to the interior of the vehicle.

7. The vehicle lighting system of claim 1, wherein the diffusor lens includes a thermoplastic polymer.

8. The vehicle lighting system of claim 1, wherein the light guide includes a thermoplastic polymer.

9. The vehicle lighting system of claim 1, wherein the light dispensing device is disposed within a center console of the vehicle, door panel of the vehicle, roof panel of the vehicle, dash panel of the vehicle, or headrest of the vehicle.

10. A vehicle lighting system for a vehicle, the vehicle lighting system comprising:
- a light guide having a first end and a second end, wherein the first end of the light guide is coupled to a light source;
- a light dispensing device coupled to the second end of the light guide and configured to receive light from the light source via the light guide and dispense the light received from the light guide to an interior of the vehicle, the light dispensing device comprising:
  - a textile configured to dispense the light from the light guide to the interior of the vehicle; and
  - a reflector configured to reflect the light towards the textile,
  - wherein an interior surface of the reflector faces the textile and the interior surface of the reflector includes a plurality of ridges configured to reflect the light within the light dispensing device that is received from the light guide towards the textile to produce a gradient of the light at the textile, and wherein the gradient of the light at the textile comprises a non-homogenous and non-uniform pattern of light.

11. The vehicle lighting system of claim 10, wherein the light dispensing device includes a lens located between the textile and the reflector, wherein a back surface of the lens and the interior surface of the reflector define a volume that receives the light from the second end of the light guide.

12. The vehicle lighting system of claim 10, wherein the light guide is a first light guide and the light dispensing device is a first light dispensing device, the vehicle lighting system further comprising:
- a second light guide having a first end and a second end, wherein the first end of the second light guide is coupled to the light source; and
- a second light dispensing device coupled to a second end of the second light guide to receive the light from the light source and dispense the light to the interior of the vehicle.

13. The vehicle lighting system of claim 11, wherein the lens includes a thermoplastic polymer.

14. The vehicle lighting system of claim 10, wherein the light guide includes a thermoplastic polymer.

15. A vehicle lighting system for a vehicle, the vehicle lighting system comprising:
- a light dispensing device configured to receive light from a light source via a light guide and dispense the light received from the light guide to an interior of the vehicle, the light dispensing device comprising:
  - a textile configured to dispense the light from the light guide to the interior of the vehicle;
  - a reflector configured to reflect the light within the light dispensing device that is received from the light guide towards the textile; and
  - a diffusor lens located between the textile and the reflector, the diffusor lens including a plurality of scattering objects disposed between a front surface of the diffusor lens and a back surface of the diffusor lens to scatter the light within the lens in a plurality of directions,
  - wherein an interior surface of the reflector faces the textile and the interior surface of the reflector includes a plurality of ridges configured to reflect the light within the light dispensing device that is received from the light guide towards the textile to produce a gradient of the light at the textile, and wherein the gradient of the light at the textile comprises a non-homogenous and non-uniform pattern of light.

16. The vehicle lighting system of claim 15, wherein the reflector is directly coupled to the back surface of the diffusor lens.

17. The vehicle lighting system of claim 15, wherein the light guide is a first light guide and the light dispensing device is a first light dispensing device, the vehicle lighting system further comprising:
- a second light dispensing device coupled to a second light guide to receive the light from the light source and dispense the light to the interior of the vehicle.

18. The vehicle lighting system of claim 15, wherein the diffusor lens includes a first thermoplastic polymer and the light guide includes a second thermoplastic polymer.

* * * * *